T. B. FORD.
AUTOMATIC EMERGENCY, RETURN CHECK AND STOP VALVE.
APPLICATION FILED JUNE 29, 1915.
1,167,287.
Patented Jan. 4, 1916.
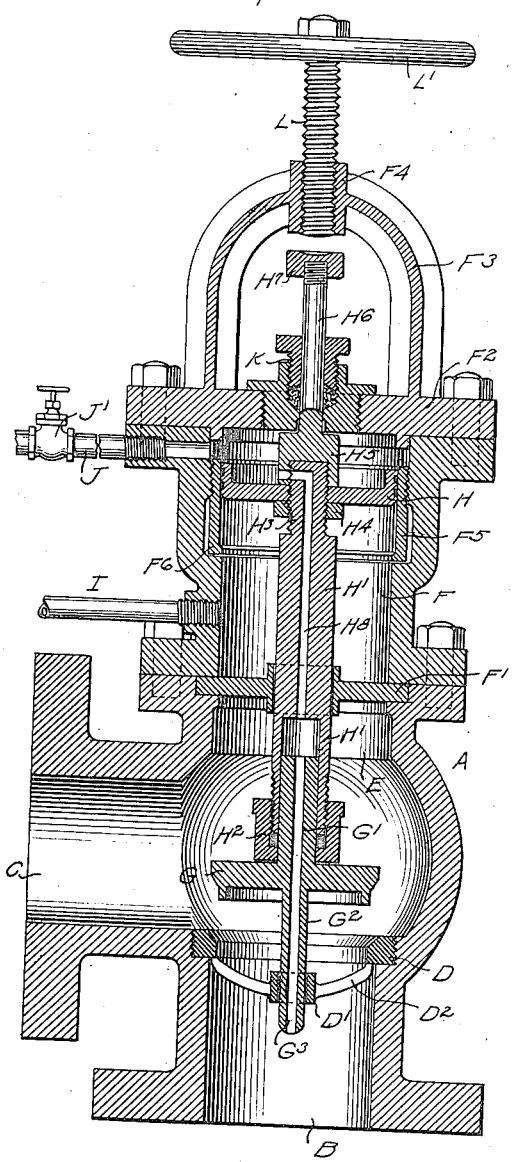
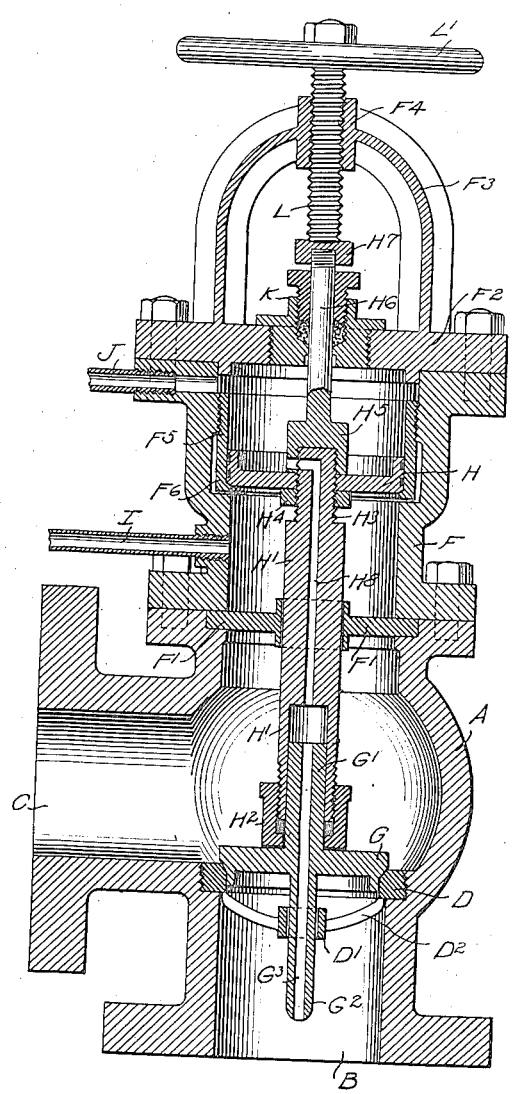
WITNESSES
INVENTOR
Thomas B. Ford.
BY
ATTORNEYS

UNITED STATES PATENT OFFICE.

THOMAS BURTON FORD, OF NEW YORK, N. Y.

AUTOMATIC EMERGENCY, RETURN-CHECK AND STOP VALVE.

1,167,287.  Specification of Letters Patent.  Patented Jan. 4, 1916.

Application filed June 29, 1915. Serial No. 36,978.

*To all whom it may concern:*

Be it known that I, THOMAS B. FORD, a citizen of the United States, and a resident of the city of New York, borough of Brooklyn, in the county of Kings and State of New York, have invented a new and Improved Automatic Emergency, Return-Check and Stop Valve, of which the following is a full, clear, and exact description.

The invention relates to valves for use in the connection between a boiler and the main, and its object is to provide a new and improved automatic emergency, return check and stop valve arranged to provide a check against the return flow of the steam into the boiler from the main, to isolate the main from the boiler in case of the sudden drop of the pressure in the main, and to allow of manually closing the valve whenever it is desired to do so.

Another object is to render the valve variably sensitive and to prevent it from sticking especially after a period of nonuse or idleness.

In order to produce the desired result, use is made of a cylinder mounted on the valve body and containing an emergency piston slidably connected with the check valve controlling the flow of the steam from the boiler to the main, the piston rod and the stem of the said check valve having connected bores connecting the inlet of the valve body with the outer end of the cylinder to exert a pressure against the piston, the other end of the cylinder being connected with the main. Use is also made of manually controlled means adapted to move the piston downward with a view to impart a similar movement to the check valve to move the latter to its seat.

A practical embodiment of the invention is represented in the accompanying drawings forming a part of this specification, in which similar characters of reference indicate corresponding parts in both views.

Figure 1 is a longitudinal central section of the automatic emergency return check and stop valve in open position; and Fig. 2 is a similar view of the same in shut-down position.

The valve body A is provided with an inlet B, an outlet C and a valve seat D intermediate the said inlet B and the said outlet C. The inlet B is connected with a boiler and the outlet C is connected with a main. The top of the valve body A is provided with an opening E directly opposite the valve seat D, and this opening E is closed by the lower cylinder head F' of a cylinder F bolted or otherwise attached to the top of the valve body A. The upper end of the cylinder F is closed by a cylinder head $F^2$ provided with a standard $F^3$ having a nut $F^4$ in axial alinement with the cylinder F.

The valve seat D is adapted to be opened and closed by a check valve G having an upwardly extending stem G' slidably engaging the lower end of a piston rod H' of a piston H mounted to reciprocate in the upper section $F^5$ of the cylinder F, and which upper section $F^5$ is preferably screwed into the cylinder F, as indicated in the drawings. The piston rod H' extends slidably through the cylinder head F' and the lower end of the piston rod H' is provided with a stuffing box $H^2$ adapted to engage the top of the check valve G. The upper end $H^3$ of the piston rod H' is provided with a screw thread screwing into the piston H and on the end $H^3$ screws a nut $H^4$ adapted to abut against the under side of the piston H to lock the latter in place after the desired adjustment is made. The lower end of the cylinder F is connected by a pipe I with the main and the upper end of the said cylinder is provided with a pipe J having a valve J' normally closed and only temporarily opened on starting the valve. The end $H^3$ extends slightly above the piston H and on this projecting terminal screws a head $H^5$ of an auxiliary piston rod $H^6$ extending through a stuffing box K held on the cylinder head $F^2$. The upper end of the auxiliary piston rod $H^6$ is provided with a head $H^7$ adapted to be engaged by a screw rod L screwing in the nut $F^4$ and provided at its upper end with a handle L'. When it is desired to close the valve, the operator turns the handle L' to screw the screw rod L downward in the nut $F^4$ with a view to finally engage the head $H^7$ and to force the same downward and with it the auxiliary stem $H^6$, the piston H and its piston rod H', whereby the stuffing box $H^2$ finally engages the check valve G and moves the latter downward onto its seat D thus positively closing the valve. The bottom of the piston H is adapted to be seated on a seat $F^6$ formed on the lower end of the cylinder section $F^5$ at the time the valve G reaches the seat D, as plainly shown in Fig. 2. It will be noticed that by mounting the piston H adjustably on the threaded end $H^3$ the piston H can be firmly seated on its seat F⁶ at the time the check valve G is seated on its seat D.

The check valve G is provided with a depending stem G² slidingly engaging a bearing D′ supported by a spider D² from the seat D. A bore G³ extends through the stem G², the valve G and its stem G′, and this bore connects at its upper end with a bore H⁸ formed in the piston rod H′ and extending through the head H⁵ into the upper end of the cylinder F. By the arrangement described boiler pressure can pass by way of the connected bores G³ and H⁸ into the upper end of the cylinder F while the lower end thereof is connected by the pipe I with the main.

The operation is as follows: When the valve is working the screw rod L is retracted, as shown in Fig. 1, and the piston H is in uppermost position to allow the valve G to act as a regular check valve for opening and closing the valve seat D to prevent return flow of the steam into the boiler. In case of a sudden drop of pressure in the main the pressure in the lower end of the cylinder F is correspondingly reduced so that the preponderance of boiler pressure in the upper end of the said cylinder F forces the piston H downward and in doing so the stuffing box H² finally engages the valve G and moves the latter downward onto its seat D, thus effectively isolating the main from the boiler. When the valve is working under normal conditions and it is desired to close the valve for any reason whatever, the operator turns the hand wheel L′ to screw the screw rod L downward to move the valve G to its seat, as previously explained. It is understood that when the valve G is in closed position, the piston H is seated on the seat F⁶ to prevent leakage of steam from the upper end of the cylinder F into the lower end thereof.

The auxiliary piston rod H⁶ extends to the atmosphere, thus providing a larger pressure area on the under side of the piston H than on the top thereof, whereby a preponderance of pressure is obtained against the under side of the piston to force the latter upward under normal conditions, that is, when the boiler pressure and main pressure are equal or nearly so. By varying the diameter of the stem H⁶ relatively to the diameter of the piston any desired proportionate variation in sensitiveness is obtained.

Having thus described my invention, I claim as new and desire to secure by Letters Patent:

1. An automatic emergency, return check and stop valve, comprising a valve body provided with an inlet, an outlet and a valve seat intermediate the said inlet and outlet, a check valve controlling the said valve seat, a cylinder connected at its inner end at all times with the main, a piston mounted to reciprocate loosely in the said cylinder and having its piston rod slidably connected with the stem of the said check valve, the said stems having connected bores connecting the inlet of the valve body with the outer end of the said cylinder, and a pipe connected with the outer end of the cylinder and having a normally closed valve.

2. An automatic emergency, return check and stop valve, comprising a valve body provided with an inlet, an outlet and a valve seat intermediate the said inlet and outlet, a check valve controlling the said valve seat, a cylinder connected at its inner end with the main, and a piston mounted to reciprocate loosely in the said cylinder and having its piston rod slidably connected with the stem of the said check valve, the said stems having connected bores connecting the inlet of the valve body with the outer end of the said cylinder, the said cylinder having an annular seat for the said piston to be seated on at the time the said check valve is seated on its seat in the valve body.

3. An automatic emergency, return check and stop valve, comprising a valve body provided with an inlet, an outlet and a valve seat intermediate the said inlet and outlet, a check valve controlling the said valve seat, a cylinder connected at its inner end with the main, a piston mounted to reciprocate loosely in the said cylinder and having its piston rod slidably connected with the stem of the said check valve, the said stems having connected bores connecting the inlet of the valve body with the outer end of the said cylinder, the said cylinder having an annular seat for the said piston to be seated on at the time the said check valve is seated on its seat in the valve body, and means for adjusting the said piston on its piston rod to insure accurate coördination in seating of the piston and the check valve.

4. An automatic emergency, return check and stop valve, comprising a valve body provided with an inlet, an outlet and a valve seat intermediate the said inlet and outlet, a check valve controlling the said valve seat, a cylinder connected at its inner end with the main, a piston mounted to reciprocate loosely in the said cylinder and having its piston rod slidably connected with the stem of the said check valve, the said stems having connected bores connecting the inlet of the valve body with the outer end of the said cylinder, the said cylinder having an annular seat for the said piston to be seated on at the time the said check valve is seated on its seat in the valve body, an auxiliary stem extending from the said piston stem to the outside of the cylinder, and a screw rod adapted to engage the said auxiliary stem to manually move the said piston and the said check valve into their seats.

5. An automatic emergency, return check and stop valve, comprising a valve body provided with an inlet, an outlet and a valve seat intermediate the said inlet and outlet, a check valve controlling the said valve seat, a cylinder connected at its inner end with the main, a piston mounted to reciprocate loosely in the said cylinder and having an adjustable piston rod slidably connected at its lower end with the stem of the said check valve, the said stems having connected bores to connect the inlet of the valve body with the outer end of the said cylinder, the lower end of the piston rod being provided with a stuffing box, and manually controlled means for moving the said piston downward to engage the stuffing box of the piston rod with the said check valve to move the latter to its seat.

6. An automatic emergency, return check and stop valve, comprising a valve body provided with an inlet, an outlet and a valve seat intermediate the said inlet and outlet, a check valve controlling the said valve seat, a cylinder connected at its inner end with the main, a piston mounted to reciprocate loosely in the said cylinder and having an adjustable piston rod slidably connected with the stem of the said check valve, the said stems having connected bores to connect the inlet of the valve body with the outer end of the said cylinder, manually controlled means for moving the said piston downward to engage the piston rod with the said check valve and to move the latter to its seat, and a seat in the said cylinder for the piston to be seated on at the time the check valve is seated on its seat.

7. An automatic emergency, return check and stop valve, comprising a valve body having an inlet connected with the boiler, an outlet connected with a main, a valve seat intermediate the inlet and outlet and a top opening opposite the said seat, a check valve adapted to control the said seat and having an upwardly extending valve stem, a cylinder attached to the said valve body at the said top opening and having a lower cylinder head closing the said opening, a connection between the lower end of the cylinder and the main, a piston slidable in the said cylinder and having a piston rod extending through the said lower cylinder head and slidably engaging the said check valve stem, the lower end of the piston rod being adapted to engage the said check valve to move it onto its seat, the said check valve stem and the said piston rod having connected bores connecting the said inlet with the upper end of the said cylinder, an upper cylinder head closing the upper end of the cylinder and provided with a standard, an auxiliary piston rod slidably extending through the said upper cylinder head, a nut on the said standard, and a screw rod screwing in the said nut and adapted to engage the said auxiliary piston rod.

8. An automatic emergency, return check and stop valve, comprising a valve body having an inlet connected with the boiler, an outlet connected with a main, a valve seat intermediate the inlet and outlet and a top opening opposite the said seat, a check valve adapted to control the said seat and having an upwardly extending valve stem, a cylinder attached to the said valve body at the said top opening and having a lower cylinder head closing the said opening, a connection between the lower end of the cylinder and the main, a piston slidable in the said cylinder and having a piston rod extending through the said lower cylinder head and slidably engaging the said check valve stem, the lower end of the piston rod being adapted to engage the said check valve to move it onto its seat, the said check valve stem and the said piston rod having connected bores connecting the said inlet with the upper end of the said cylinder, an upper cylinder head closing the upper end of the cylinder and provided with a standard, an auxiliary piston rod slidably extending through the said upper cylinder head, a nut on the said standard, a screw rod screwing on the said nut and adapted to engage the said auxiliary piston rod, and a valved pipe connected with the upper end of the said cylinder.

9. An automatic emergency, return check and stop valve, comprising a valve body having an inlet connected with the boiler, an outlet connected with a main, a valve seat intermediate the inlet and outlet and a top opening opposite the said seat, a check valve adapted to control the said seat and having an upwardly extending valve stem, a cylinder attached to the said valve body at the said top opening and having a lower cylinder head closing the said opening, a connection between the lower end of the cylinder and the main, a piston slidable in the said cylinder and having a piston rod extending through the said lower cylinder head and slidably engaging the said check valve stem, the lower end of the piston rod being adapted to engage the said check valve to move it onto its seat, the said check valve stem and the said piston rod having connected bores connecting the said inlet with the upper end of the said cylinder, the said cylinder having a seat adapted to be engaged by the said piston at the time the said valve is moved to its seat by the piston rod, an upper cylinder head closing the upper end of the cylinder and provided with a standard, an auxiliary piston rod slidably extending through the said upper cylinder head, a nut on the said standard, and a screw rod screwing in the said nut and adapted to engage the said auxiliary piston rod.

10. An automatic emergency return check and stop valve, comprising a valve body provided with an inlet, an outlet and a valve seat intermediate the said inlet and outlet, a check valve controlling the said valve seat, and having an upwardly extending valve stem, a cylinder attached to the top of the valve body and having an upper and a lower cylinder head, the cylinder being connected at its inner end with the main, a piston mounted to reciprocate loosely in the said cylinder and having its piston rod extending through the lower cylinder head and slidably connected at its lower end with the stem of the said check valve, the said stems having connected bores connecting the inlet of the valve body with the outer end of the said cylinder, the said piston being adjustably secured to the upper end of the piston rod, and the said cylinder having a seat adapted to be engaged by the said piston.

In testimony whereof I have signed my name to this specification in the presence of two subscribing witnesses.

THOMAS BURTON FORD.

Witnesses:
 THEO. G. HOSTER,
 PHILIP D. ROLLHAUS.